(12) United States Patent
Chakravaram

(10) Patent No.: US 11,982,046 B2
(45) Date of Patent: May 14, 2024

(54) BRIDGE BETWEEN WASHER AND DRYER

(71) Applicant: Vishnu Vardhan Chakravaram, Goodlettsville, TN (US)

(72) Inventor: Vishnu Vardhan Chakravaram, Goodlettsville, TN (US)

(73) Assignee: Vishnu Vardhan Chakravaram, Gallatin, TN (US)

( * ) Notice: Subject to any disclaimer, the term of this patent is extended or adjusted under 35 U.S.C. 154(b) by 184 days.

(21) Appl. No.: 17/686,401

(22) Filed: Mar. 3, 2022

(65) Prior Publication Data

US 2023/0304212 A1 Sep. 28, 2023

Related U.S. Application Data

(60) Provisional application No. 63/205,636, filed on Jan. 3, 2021.

(51) Int. Cl.
*D06F 95/00* (2006.01)

(52) U.S. Cl.
CPC .................. *D06F 95/00* (2013.01)

(58) Field of Classification Search
CPC ..... B65G 11/00; B65G 11/023; B65G 11/183; D06F 29/00; D06F 29/005; D06F 39/12; D06F 39/14; D06F 95/00; D06F 95/002; D06F 95/004; D06F 95/006; D06F 95/008
USPC ............................ 193/2 A, 2 R, 3, 4; 68/210
See application file for complete search history.

(56) References Cited

U.S. PATENT DOCUMENTS

| | | | | |
|---|---|---|---|---|
| 145,720 A * | 12/1873 | Chess | ..................... | B07B 13/00 209/676 |
| 270,955 A * | 1/1883 | Key | ..................... | F16B 45/036 24/600.9 |
| 1,252,616 A * | 1/1918 | Reif | ..................... | A63H 33/04 446/124 |
| 1,768,247 A * | 6/1930 | Gardner | ..................... | F23K 3/00 193/3 |
| 3,464,733 A * | 9/1969 | Shaw | ..................... | D06F 95/004 294/68.21 |
| 3,796,429 A * | 3/1974 | Johnston | ..................... | A63G 21/00 104/69 |
| 4,211,400 A * | 7/1980 | Ray | ..................... | A63G 21/00 403/337 |
| 4,299,171 A * | 11/1981 | Larson | ..................... | A63G 3/02 472/117 |
| 6,315,159 B1 * | 11/2001 | Paczkowski | ..................... | G07F 11/16 221/312 R |
| 6,463,768 B1 * | 10/2002 | Shaw | ..................... | D06F 95/00 68/210 |
| 6,966,417 B2 * | 11/2005 | Peklo | ..................... | G07D 9/00 194/344 |

(Continued)

FOREIGN PATENT DOCUMENTS

GB 2185735 A * 7/1987 .......... B65G 11/183
GB 2330829 A * 5/1999 .......... B65G 11/16

*Primary Examiner* — Joshua E Rodden
(74) *Attorney, Agent, or Firm* — Vishnu Vardhan Chakravaram

(57) ABSTRACT

A ramp bridge assembly to arrange with various models of washer and dryers, or other possible appliances. The assembly provides ease of transfer of washed clothes from washer to dryer. The assembly also helps prevent washed clothes from falling on the ground, and provides easy and quick transfer of washed clothes from the washer to dryer to avoid back pain for the user. The assembly is also portable.

32 Claims, 16 Drawing Sheets

(56) References Cited

U.S. PATENT DOCUMENTS

| | | | | |
|---|---|---|---|---|
| 7,140,206 B2* | 11/2006 | Braun | ............... | D06F 31/00 |
| | | | | 68/3 R |
| 10,240,275 B1* | 3/2019 | Groves | ............... | D06F 95/00 |
| 2013/0213762 A1* | 8/2013 | Gustafson | ............... | E04G 21/0481 |
| | | | | 193/2 A |
| 2019/0309466 A1* | 10/2019 | Fullmer | ............... | D06F 95/002 |
| 2022/0212872 A1* | 7/2022 | Wargo | ............... | B65G 11/081 |

* cited by examiner

BRIDGE BETWEEN WASHER AND DRYER

CROSS-REFERENCE TO RELATED APPLICATIONS

This application claims the benefit of provisional application No. 63/205,636, filed on Jan. 3, 2021.

BACKGROUND OF THE INVENTION

There is a lot of pain involved in transferring clothes from washer to dryer. The wet clothes while transferring from washer to dryer often fall on the floor which is often dirty. The current invention prevents the clothes from falling on the floor, by providing a downward slope with guarded walls forming a bridge between washer and dryer, and preventing wet washed clothes from falling on the ground, when the user tries to transfer them to dryer.

BRIEF SUMMARY OF THE INVENTION

In one embodiment, the composite structure is a bridge between washer and dryer, wherein washer is top load and dryer is a side load, however washer and dryer facing each other. In other embodiment, the composite structure is a bridge between washer and dryer, wherein washer is a top load and dryer is also a top load, however washer and dryer facing each other. In another embodiment, the composite structure is a bridge between washer and dryer, wherein washer is a side load and dryer are also a side load, however washer and dryer facing each other.

In one embodiment, the composite structure is a bridge between washer and dryer, wherein washer is top load and dryer is side load, however washer and dryer are sitting side by side to each other. In another embodiment, the composite structure is a bridge between washer and dryer, wherein washer is a top load dryer is also a top load, however washer and dryer sitting side by side to each other. In yet another embodiment, the composite structure is a bridge between washer and dryer, wherein washer is a side load and dryer are also a side load, however washer and dryer are sitting side by side to each other.

To illustrate the versatility the composite structure can be installed on a surface, where things need to be transferred from one point in height to another point in height, possibly high to low or between same level of height. The composite structure can be configured for myriad of usage. For example, the composite structure can be used to slide various things such as clothes, utensils etc.

The various embodiments enable, support and/or provide a new paradigm in the field of consumer goods. The embodiments disclose a bridge between washer and dryer, which enables the user with an easy, quick, and effortless transfer of clothes from washer to dryer. This embodiment of bridge between washer and dryer provides a great solution for transferring clothes from washer to dryer. For example, user picks up wet washed clothes from washer and drops on the said embodiment, which is very less effort compared to transferring the clothes from washer to dryer one at a time.

Bridge between washer to dryer, provides easy and quick transfer of washed clothes from washer to dryer. User picks up the wet clothes from washer and drops them off on the slope of the bridge between washer and dryer, the slope contains the clothes and slides them into the dryer. Unlike before, user does not have to bend multiple times and pick clothes from washer and again bend to drop them off in dryer.

BRIEF DESCRIPTION OF THE SEVERAL VIEWS OF THE DRAWING(S)

In order that the invention maybe more fully understood, it will now be described, by way of example, with reference to the accompanying drawing in which.

DETAILED DESCRIPTION OF THE INVENTION

The invention will be primarily described within the context of embodiments; however, those skilled in the art and informed by the teachings herein will realize that the invention is also applicable to other technical areas and/or embodiments. Practitioners skilled in the art will recognize numerous other embodiments as well.

The Illustrative embodiments described herein are not meant to be limiting. It may be readily understood that certain aspects of the disclosed embodiments can be arranged and combined in a variety of different configurations, all of which are contemplated herein.

FIGS. 1-16 illustrates a composite structure 100, 500, 800, 1000.

Figure 1:
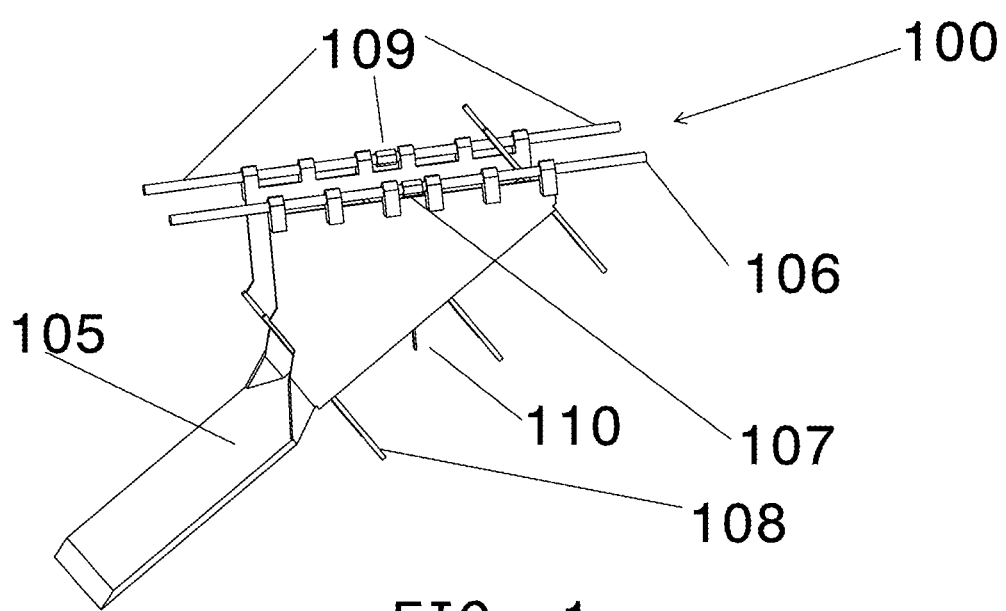
FIG. 1 is an illustrative Isometric view of ramp bridge assembly of the present invention in use.

FIG. 1 depicts isometric and side views of an exemplary composite structure according to an embodiment. The composite structure preferably comprises of four (4) major segments, namely, (1) ramp bridge 105, (2) pole 106, (3) combiner 107, (4) rope 108.

Figure 2:
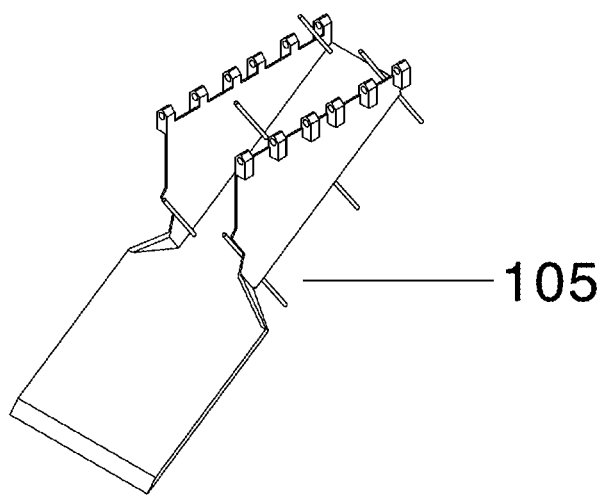
FIG. 2 is a perspective of rear, front, side, bottom, top and isometric views of ramp bridge of the present invention.

FIG. 2 depicts Isometric, Bottom, top and left views of exemplary ramp bridge 105 according to an embodiment of composite structure of FIG. 1. Ramp bridge shown in FIG. 2 facilitates the clothes to slide down the ramp bridge into the dryer.

Figure 3:
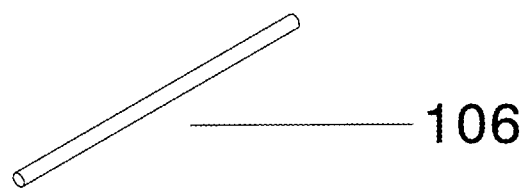
FIG. 3 is perspective of top, side, and isometric views of pole of the present invention.

FIG. 3 depicts Isometric, top, and side views of an exemplary pole mechanism 106, according to an embodiment of the composite structure of FIG. 1.

Figure 4:
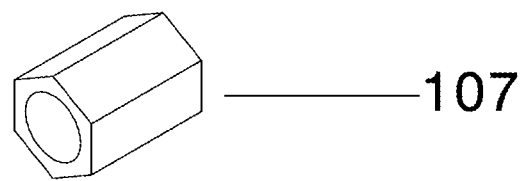
FIG. 4 is a perspective of side, top and isometric views of combiner of the present invention.

FIG. 4 depicts Isometric, top, and side views of an exemplary combiner mechanism 107, according to an embodiment of the composite structure of FIG. 1.

Figure 5:
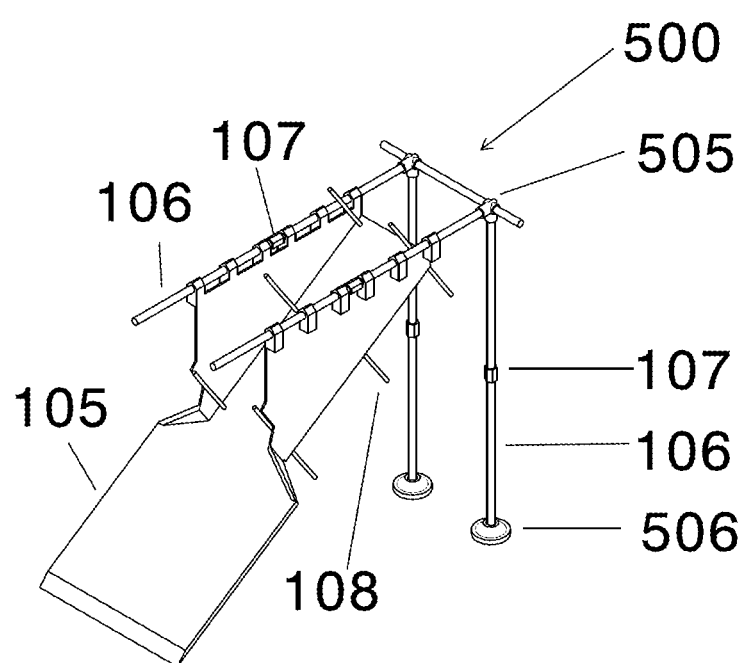
FIG. 5 is a perspective of isometric view of variation in ramp bridge assembly for washer and dryer side by side or perpendicular to each other configuration of the present invention.

FIG. 5 depicts Isometric view of an exemplary composite structure according to an embodiment. The composite structure preferably comprises of six (6) major segments, namely, (1) ramp bridge 105, (2) pole 106, (3) combiner 107, (4) rope 108, (5) T-joint 505, (6) base 506.

Figure 6:
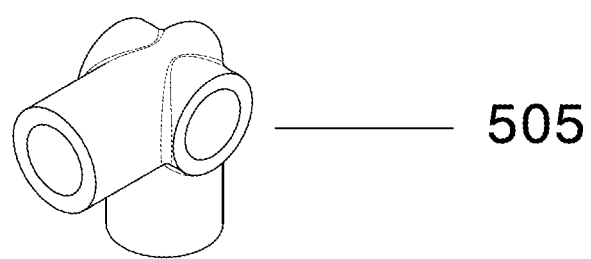
FIG. 6 is a perspective of front, isometric, side bottom top and front views of the T-joint of the present invention.

FIG. 6 depicts Isometric, top, side views of an exemplary T-joint mechanism 505, according to an embodiment of the composite structure of FIG. 5.

Figure 7:
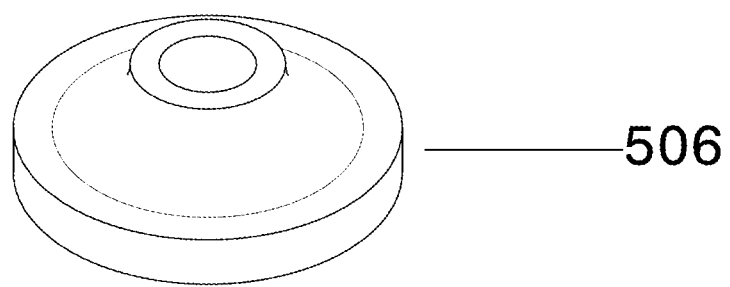
FIG. 7 is a perspective of isometric, side, top and bottom views of base in the present invention.

FIG. 7 depicts Isometric, top, bottom and side views of an exemplary base 506, according to an embodiment of the composite structure of FIG. 5.

Figure 8:
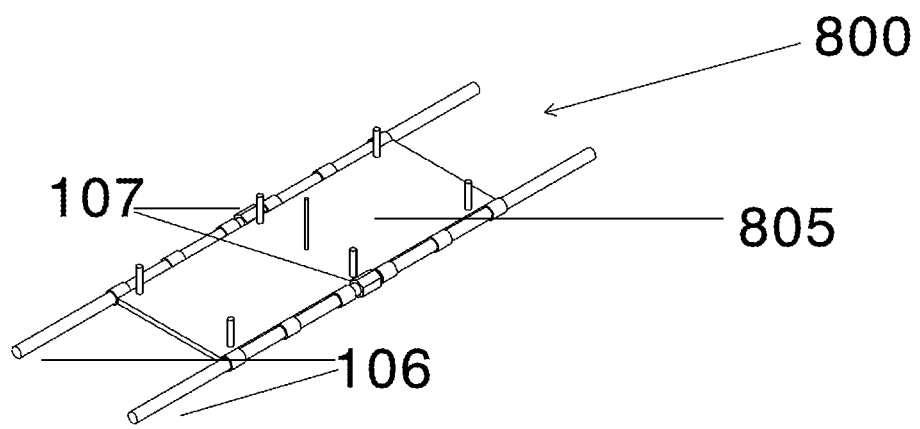
FIG. 8 is a perspective of isometric view of horizontal bridge assembly of the present invention.

FIG. 8 depicts Isometric view of an exemplary composite structure according to an embodiment. The embodiment preferably consists of three (3) major segments namely, (1) pole 106, (2) combiner 107, (3) slope bridge 805.

Figure 9:
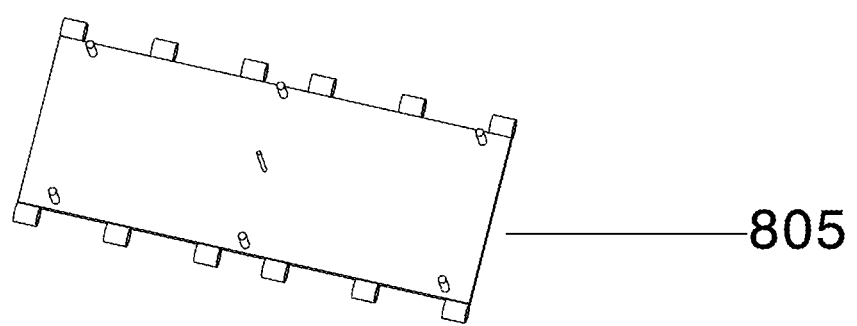
FIG. 9 is perspective of isometric, top, side, and bottom views of horizontal bridge of the present invention.

FIG. 9 depicts Isometric, top, and side views of an exemplary slope bridge 805, according to an embodiment of the composite structure of FIG. 8.

Figure 10:
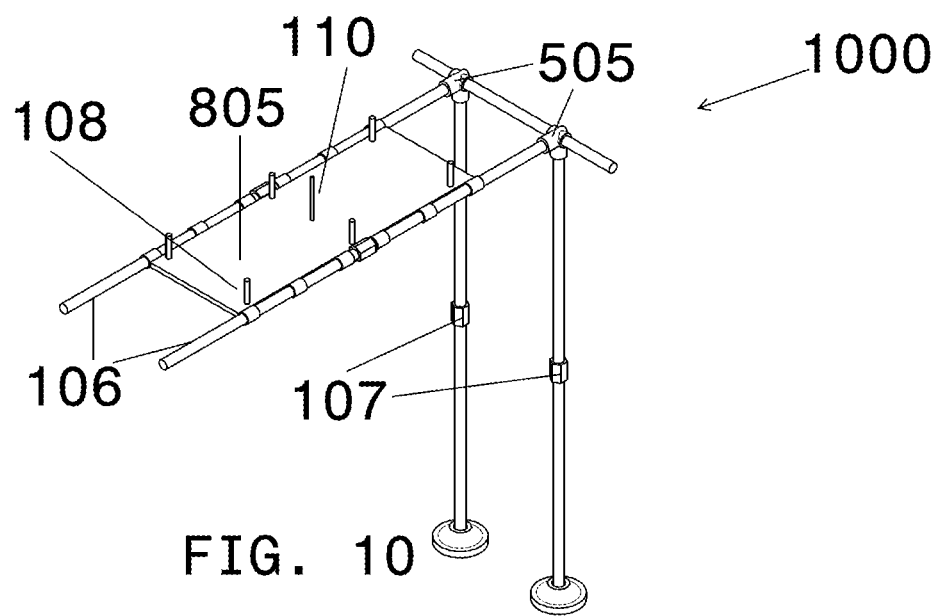
FIG. 10 is a perspective of isometric view of variation in horizontal bridge assembly for washer and dryer side by side to each other or perpendicular to each other configuration in the present invention.

FIG. 10 depicts Isometric view of an exemplary composite structure according to an embodiment. This embodiment preferably consists of five (5) major segments namely, (1) pole 106, (2) combiner 107, (3) T-joint 505, (4) base 506, (5) slope bridge 805.

Figure 11:
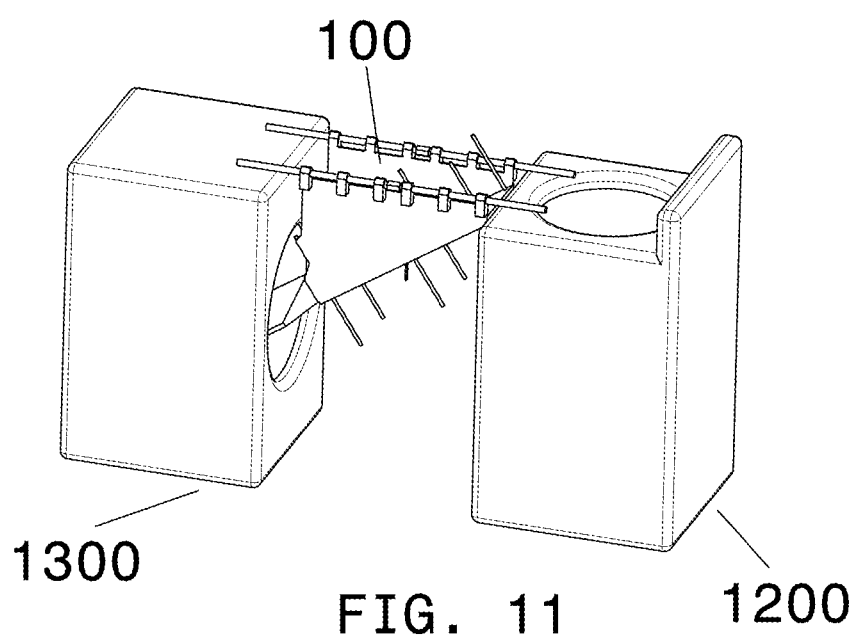
FIG. 11 is an illustrative isometric view of the ramp bridge assembly of the present invention in use with washer top load and dryer side load.

FIG. 11 depicts isometric view of an exemplary composite structure according to an embodiment. This embodiment preferably consists of six (6) major segments namely, (1) ramp bridge 105, (2) pole 106, (3) combiner 107, (4) thread/rope 108, (5) washer top load 1200, (6) dryer side load 1300. As described above, composite structure 100, preferably consists of ramp bridge 105, pole 106, combiner 107, thread/rope 108. All four (4) parts mentioned above are interdepend able. Which means that the shape of composite structure 100 changes. The composite structure 100 serves as a bridge between washer top load 1200 and dryer side load 1300, in a way that pole 106 gets combined with another pole 106 using a combiner 107, thus becoming long enough pole 109 to span from the top surface of washer top load 1200, to stop surface of dryer side load 1300, with ramp bridge 105, sloped towards or into the mouth of dryer side load 1300. The user picks up washed clothes from washer top load 1200 and drops them on the ramp bridge ramp bridge 105. The clothes dropped on 105 gets slided into the mouth. The composite structure 100 can be folded and held together using strap 110 hanging under 105, which is stitched to 105.

Figure 12:
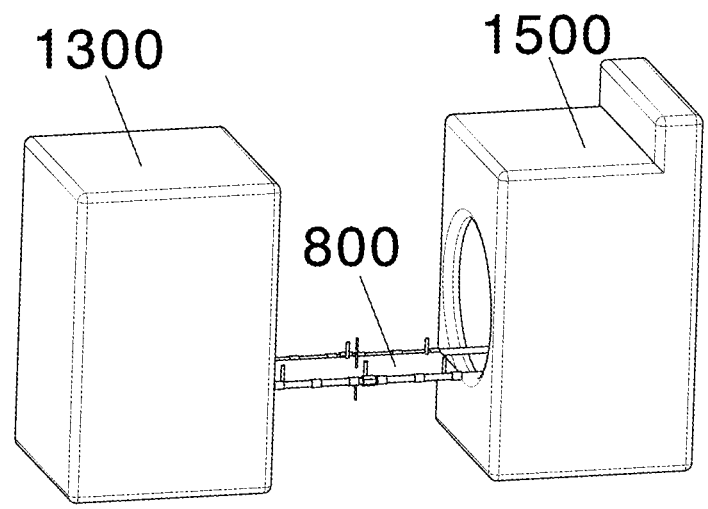
FIG. 12 is an illustrative isometric view of the horizontal bridge assembly of the present invention in use with washer and dryer side load.

FIG. 12 depicts isometric view of an exemplary composite structure according to an embodiment. This embodiment preferably consists of seven (7) major segments namely (1) horizontal bridge 805, (2) pole 106, (3) combiner 107, (4) thread rope 108, (5) strap 110, (6) washer side load 1500, (7) dryer side load 1300. As described above, composite structure 800, preferably consists of horizontal bridge 805, pole 106, combiner 107, thread/rope 108, pole assembly 109 and strap 110. The composite structure 800, preferably consists of horizontal bridge 805 between wager side load 1500 and dryer side lid 1300. The composite structure 800 is a derivative of composite structure 100. The thread/rope 108 which is located at six different locations on ramp bridge 105, when tied to the pole 106, at all 6 locations, results in composite structure 100 transform into composite structure 800. The composite structure 800, can be placed in between washer side load 1500, and dryer side load 1300, by resting each side of composite structure 800 into the mouth of washer side load 1500, and dryer side load 1300. The composite structure 800, when placed between washer side load 1500, dryer side load 1300, can be used as a place to in strangle the wet clothes before placing them into dryer side load 1300.

Figure 13:
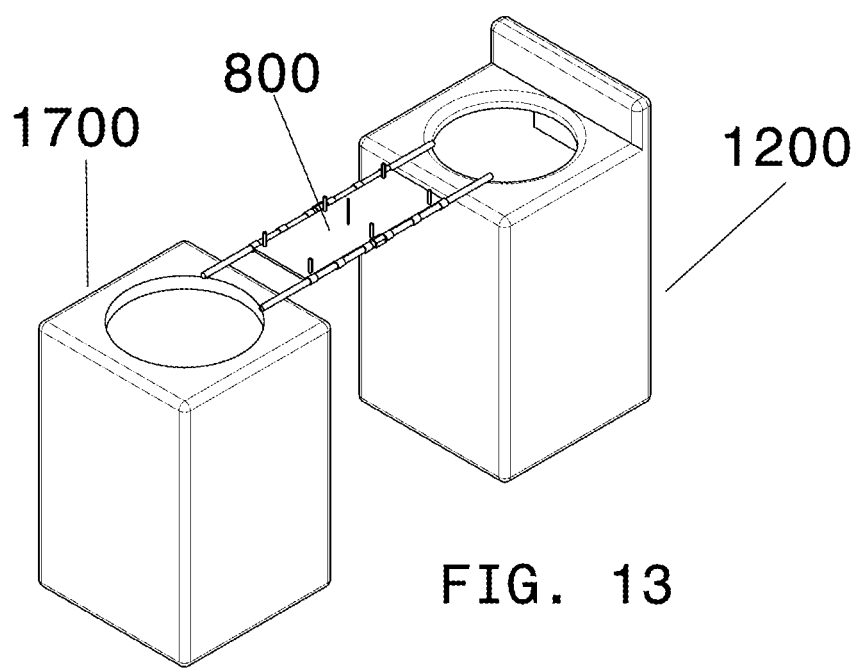
FIG. 13 is an illustrative isometric view of the horizontal bridge assembly of the present invention in use with washer and dryer top load.

FIG. 13 depicts isometric view of an exemplary composite structure according to an embodiment. This embodiment preferably consists of seven (7) major segments namely (1) horizontal bridge 805, (2) pole 106, (3) combiner 107, (4) thread rope 108, (5) strap 110, (6) washer top load 1200, (7) dryer top load 1700. As described above, composite structure 800, preferably consists of horizontal bridge 805, pole 106, combiner 107, thread/rope 108, pole assembly 109 and strap 110. The composite structure 800, preferably consists of horizontal bridge 805 between washer top load 1200 and dryer top load 1700. The composite structure 800 is a derivative of composite structure 100. The thread/rope 108 which is located at six different locations on ramp bridge 105, when tied to the pole 106, at all 6 locations, results in composite structure 100 transform into composite structure 800. The composite structure 800, can be placed in between washer top load 1200, and dryer top load 1700, by resting each side of composite structure 800 on the top surface of washer top load 1200, and dryer top load 1700. The composite structure 800, when placed between washer top load 1200, dryer top load 1700, can be used as a place to untangle the wet clothes before placing them into dryer top load 1700.

Figure 14:
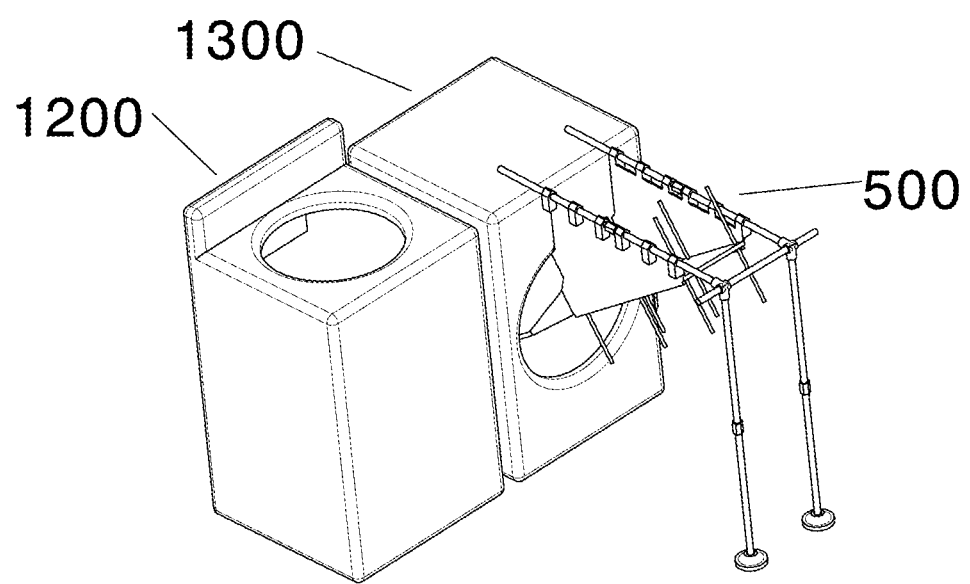
FIG. 14 is an illustrative isometric view of the ramp bridge assembly for washer and dryer side by side or perpendicular to each other configuration of the present invention in use with washer top load and dryer side load.

FIG. 14 Depicts isometric view of an exemplary composite structure according to an embodiment. This embodiment preferably consists of nine (9) major segments namely. (1) ramp bridge 105, (2) pole 106, (3) combiner 107, (4) thread/rope 108, (5) t-joint 505, (6) base 506, (7) strap 110, (8) washer top load 1200, (9) dryer side load 1300. As described above composite structure 500, preferably consists of ramp bridge 105, pole 106, combiner 107, thread/rope 108, t-joint 505, base 506, strap 110. The composite structure 500 serves as a sliding mechanism structure wherein washed clothes are dropped in the ramp bridge 105, pole 106 is slider through the sleeve of the ramp bridge 105. Each side of ramp bridge 105 need two (2) pole 106, connected with comber 107, at the center of sleeve as pottery in composite structure 500. The far end of pole 106 on both sides of composite structure ramp bridge 105, towards the inclined side of ramp bridge 105, is connected t-joint 505. T-joint 505 has three (3) openings right angles to each other as portrayed in right side view 605, 610, and 630 each end of pole 106, connected to ramp bridge 105 are on the inclined side of ramp bridge 105, gets connected to t-joint front view of 605. A pole 106 runs through T-joint side view 605, from T-joint 505 on the right of ramp bridge 105, to the openings on T-joint 505 side view 605 on the left side of ramp bridge 105. A pole 106 on either side gets connected to combiner 107. The bottom edge of pole 106 on either side of 105 gets connected to base 506. Thus, forming the composite structure 500. The composite structure 500, can be in a scenario with a top load six (6) sided box capable of washing and side load dryer. Wherein user pulls washed clothes from washer top load 1200 and drop off on ramp bridge 105.

Figure 15:
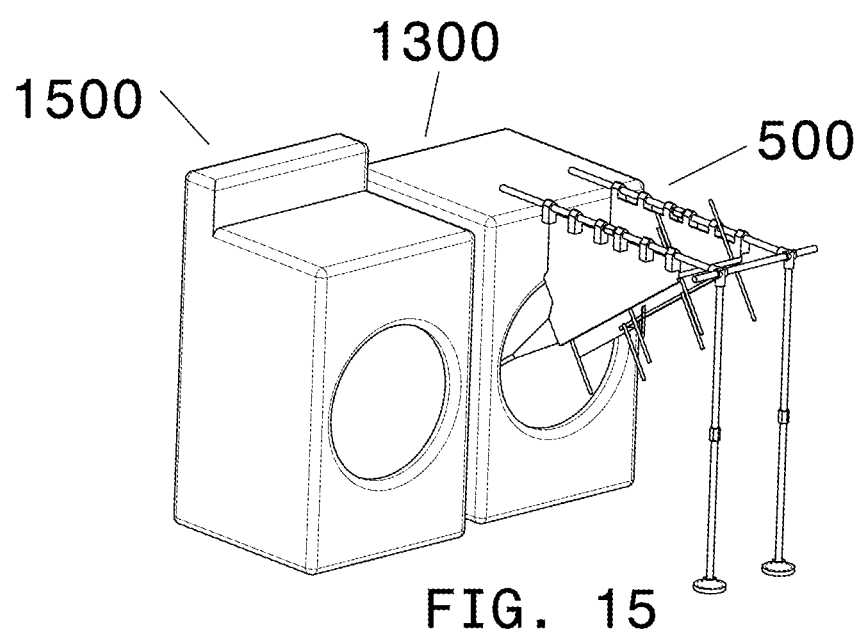
FIG. 15 is an illustrative isometric view of the ramp bridge assembly for washer and dryer side by side or perpendicular to each other configuration of the present invention in use with washer and dryer side load.

FIG. 15 depicts isometric view of an exemplary composite structure according to an embodiment. This embodiment preferably consists of nine (9) major segments namely (1) ramp bridge 105, (2) pole 106, (3) combiner 107, (4) thread rope 108, (5) T-joint 505, (6) base 506, (7) strap 110, (8) washer side load 1500, (9) dryer side load 1300. The composite structure 500, as described in FIG. 14 is placed in the similar method described in FIG. 14.

Figure 16:
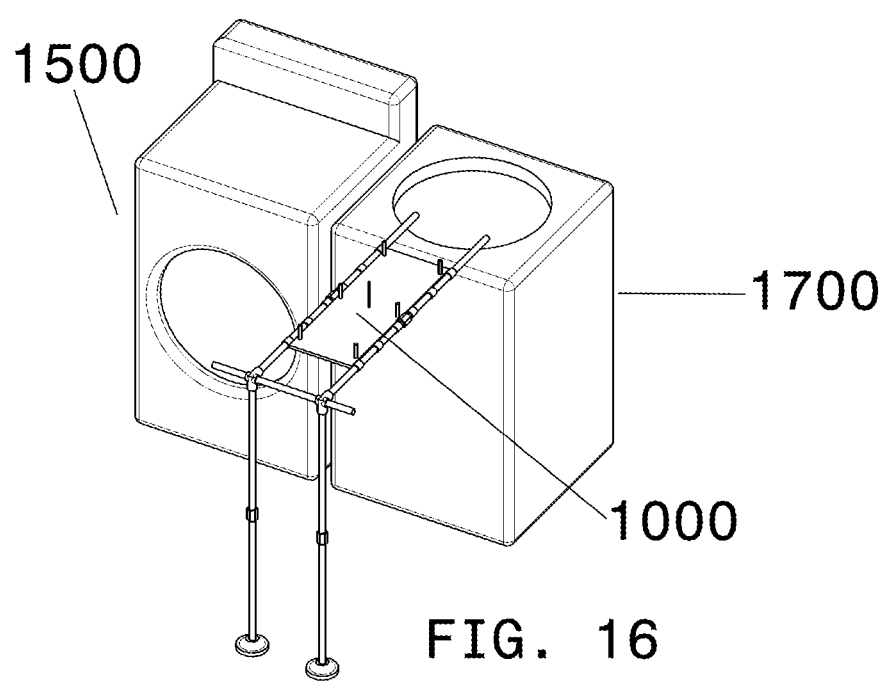
FIG. 16 is an illustrative isometric view of the of horizontal bridge assembly for washer and dryer side by side or perpendicular to each other configuration of the present invention in use with washer and dryer top load.

FIG. 16 depicts isometric view of an exemplary composite structure according to an embodiment. This embodiment preferably consists of seven (7) major segments namely (1) horizontal bridge 805, (2) pole 106, (3) combiner 107, (4) T-joint 505, (5) base 506, (6) washer side load 1500, (7) top load dryer 1700. As described above, composite structure 1000, preferably consists of horizontal bridge 805, strap 110, thread/rope 108, T-joint 505, base 506, washer side load 1500, dryer top load 1700. The composite structure 1000 serves as a slider mechanism structure, wherein clothes are dropped on the horizontal bridge 805. Pole 106 is slided through the sleeve of horizontal bridge 805. Each side of horizontal bridge 805 need two (2) pole 106, connect with combiner 107 at the center of sleeve as portrayed in composter structure 1000. The far end of the pole 106, on both sides of composite structure horizontal bridge 805, towards the end of pole 106 on the side which is not on the surface of the dryer 1700, gets connected to T-joint 505.

The invention claimed is:

1. A composite structure which is a bridge between a washer and a dryer, comprising:
    a substantially downward sloped ramp bridge, the ramp bridge provided with a U-shaped vertical cross section, the ramp bridge widens at one end of the ramp bridge, which allows clothes to slide down into a mouth of the dryer without falling to a floor;
    said ramp bridge has walls on either side of the ramp bridge to ensure a proper channel system is established;
    said ramp bridge has ribs underneath on either side to ensure the U-shaped vertical cross section of ramp bridge is maintained, the ribs run throughout a bottom side until a point where the said ramp bridge starts to widen; and
    a strap stitched to a bottom center of the ramp bridge facilitates to hold the ramp bridge together when folded.

2. The composite structure as described in claim 1, wherein said ramp bridge further comprises sleeves on either side, and a plurality of poles configured to slide through said sleeves.

3. The composite structure as described in claim 2, wherein said ramp bridge further comprises combiners to hold together two of the poles to further increase an overall length of the poles when attached to one another.

4. The composite structure as described in claim 3, wherein said ramp bridge is configured to be suspended in a gap between two surfaces at a height above the floor, by support of the poles on the surfaces of the washer and the dryer appliances at the height from the floor.

5. The composite structure as described in claim 4, wherein said ramp bridge is configured to be used to move the clothes, and reduce a number of to and from moments of a user to bend and pick up the clothes from a top load or side load of said washer and drop the clothes in a top load or side load of said dryer.

6. The composite structure as described in claim 1, wherein said ramp bridge is configured to be folded in half for storage/compatibility.

7. The composite structure as described in claim 1, wherein said ramp bridge is configured be wrapped around a pole for portability.

8. The composite structure as described in claim 4, wherein said ramp bridge is configured to be used to prevent was the clothes from falling to the floor and becoming dirty.

9. The composite structure as described in claim 4, wherein said ramp bridge is configured to be is used for quick transfer of the clothes from the washer to the dryer.

10. The composite structure as described in claim 4, wherein said ramp bridge is configured to be is used to prevent back pain, due to prolonged and continuous bending and turning.

11. The ramp bridge composite structure as described in claim 4, wherein said ramp bridge is configured to be is used to make a quick transfer of the clothes.

12. The composite structure as described in claim 4, configured to be used to transfer clothes between a top load of the washer and a side load of the dryer, while an arrangement of the washer and dryer is such that they face each other.

13. The composite structure as described in claim 3, the strap stitched at six (6) different locations inside of the ramp bridge, which is configured to be tied to a pole to adjust an angle of slope or a declination angle.

14. The ramp bridge composite structure as described in claim 4, which is configured to be used to transfer the clothes between a side load of the washer and a side load of the dryer while they face each other, adjusting a declination angle to zero (0) degrees.

15. The ramp bridge composite structure as described in claim 13, wherein said ramp bridge is configured be used between a side load of the washer and a side load of the dryer by adjusting the declination angle to zero (0) degrees, thereby transforming it said ramp bridge to a horizontal bridge.

16. The ramp bridge composite structure as described in claim 3, wherein said ramp bridge further comprises a T-joint connected to an end of one of the poles on the side where a declination of said ramp bridge starts on either side of said ramp bridge.

17. The ramp bridge composite structure as described in claim 16, wherein said ramp bridge further comprises of said one of the poles, running through the said T-join horizontally, thus connecting said poles on either side of ramp bridge, to bring more stability and to ensure the poles are connected.

18. The composite structure as described in claim 17, wherein said ramp bridge comprises of another one of the poles connected to said T-joint at an opening at a bottom of said T-joint, and an identical arrangement is made on another side of said ramp bridge.

19. The ramp bridge composite structure as described in claim 18, wherein said ramp bridge further comprises one of said combiners connected to said another one of the poles at an end opposite from said T-joint.

20. The composite structure as described in claim 19, wherein said ramp bridge further comprises an additional pole connected vertically to said one of said combiners connected to said another one of the poles.

21. The composite structure as described in claim 20, wherein said ramp bridge further comprises of a base connected to a remaining side of the additional pole opposite from said one of said combiners.

22. The ramp bridge composite structure as described in claim 21, which is configured to be used to transfer the clothes between a top load of the washer and a side load of the dryer, wherein said washer and dryer are sitting side by side to each other.

23. The composite structure as described in claim 22, which is configured to be used to prevent back pain, for quick and efficient transfer of the clothes to prevent the clothes from falling on the floor and getting dirty.

24. The ramp bridge composite structure as described in claim 21, which is configured to be used with a side load of the washer and a side load of the dryer for transfer of the clothes, wherein the washer and the dryer are sitting side by side.

25. The composite structure as described in claim 24, which is configured to be used to prevent back pain caused due to frequent to and from moment between the washer and the dryer from quick and efficient transfer of the clothes to prevent clothes from falling on the floor and getting dirty.

26. The composite structure as described in claim 13, which is configured to be modified and used between a top load of the washer and a top load of the dryer facing each other, wherein using said rope, the declination angle is configured to be made zero (0) degrees.

27. The composite structure described in claim 21, which is configured to be made a horizontal bridge by adjusting the declination angle to zero (0) degrees using said rope.

28. The composite structure as described in claim 27, which is configured to be used to transfer the clothes from a side load of the washer to a top load of the dryer, sitting side by side, wherein respective ones of the horizontal poles are placed on the mouth of the dryer.

29. The composite structure as described in claim 21, which is configured to be used, where the ramp bridge is placed into the mouth of a side load of the dryer, when a top load of the washer and the side load of the dryer are at right angles to each other.

30. The ramp bridge composite structure as described in claim 21, which is configured be used where the ramp bridge is placed into the mouth of a side load of the dryer, respective ones of the poles resting on a surface of the dryer, respective ones of the poles touching the floor, wherein the washer is a side load, and the side load of the washer and the side load of the dryer are at right angles to each other.

31. The composite structure as described in claim 27, which is configured to be used, wherein a top load of the dryer and a side load of the washer are at right angles to each other, wherein respective ones of the poles are placed on a top surface of the dryer to load, and respective ones of the poles are placed on the floor.

32. The composite structure as described in claim 4, which is configured to be used, wherein a top load of the dryer and a top load of the washer, are at right angles to each other, where the ramp bridge is rested diagonally on surfaces of the top load of the dryer and the top load of the washer.

* * * * *